Aug. 21, 1956     S. M. BOLTUCH ET AL     2,759,478
VAGINAL MOLD
Filed Nov. 19, 1953
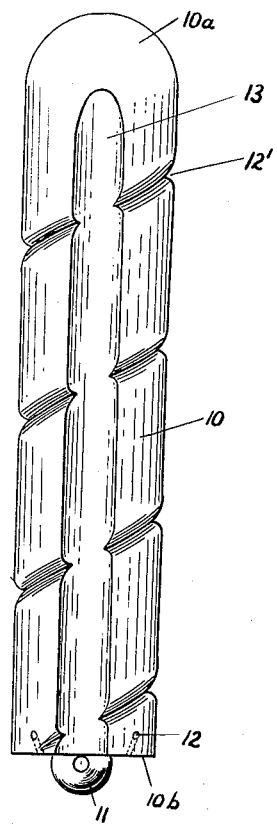
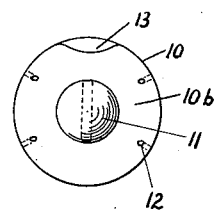
ROSARIO MONACO
SALO M. BOLTUCH
FOSTER MONACO
INVENTORS
BY *Karl F. Ross*
AGENT

United States Patent Office 2,759,478
Patented Aug. 21, 1956

2,759,478
VAGINAL MOLD

Salo M. Boltuch, New York, Foster Monaco, Jackson Heights, and Rosario Monaco, East Meadow, N. Y., assignors to Mastercraft Plastics Co., Inc., Jamaica, N. Y., a corporation of New York Application November 19, 1953, Serial No. 393,097

9 Claims. (Cl. 128—341)

The present invention relates to the art of artificially forming or reforming a vagina, and more particularly to a mold for constructing artificial vaginas and/or for dilating unduly small vaginas.

Some women are born without a properly formed vagina or with a vagina which is undeveloped or underdeveloped. Plastic surgery has been successfully applied in such cases and artificial vaginas have been constructed.

As an aid in such surgery, various molds have been used. One known mold of this type has been made of pine wood covered with a rubber condom. Such molds must be carefully sterilized by soaking in anti-bacterial solutions and it has been found that they exert a pressure resulting in sloughing of the urethra. Other molds were made of balsa wood but this material swells under the constant heat of the body, making it unsatisfactory for use in a newly built or rebuilt vagina. In addition, the known molds presented problems in connection with drainage and proved unsatisfactory in this respect.

It is the principal object of the present invention to provide an improved mold or dilator for use in the artificial construction or reformation of the vagina.

It is a more particular object of this invention to provide a mold or dilator of the above type of a material which can be easily sterilized.

It is another object of the invention to provide a vaginal mold or dilator of such structure and material that undue pressures on the vaginal walls or adjacent parts will be avoided and satisfactory drainage will be assured.

The above and other objects are accomplished in accordance with the present invention by providing a vaginal mold or dilator of a synthetic resin, such as an acrylic resin, such mold consisting of a cylindrical body having a helical drainage groove and a longitudinally extending sub-urethral groove.

In a preferred embodiment of the invention, the cylindrical body has a plurality of small circumferential openings at the distal part thereof for suturing the mold and graft of the skin to the edge of the vestibule of the vaginal opening. Also, the plane surface of the distal part of the mold may be provided with a loop or eyelet to facilitate removal of the mold from the vagina.

The various features and advantages of the invention will be more fully understood in connection with the following detailed description of a now preferred embodiment thereof, taken in conjunction with the accompanying drawing wherein:

Fig. 1 shows a side view of a vaginal mold or dilator in accordance with the invention; and Fig. 2 is a face view of the distal part thereof.

Referring now to the drawing, there is shown a generally cylindrical body 10 of acrylic resin, such as available in the trade under the trademark "Plexiglas" or "Lucite." Equivalent plastic substances could be used and are within the scope of the invention. The cylindrical body is of a suitable length and diameter for constructing and/or dilating a vagina. Lengths of 12–15 cm. and diameters of about 3–5 cm. have been found suitable in practice.

The cylindrical plastic body is preferably provided with a dome-shaped end 10a while its distal part 10b is flat. To facilitate removal of the mold from the vagina, loop or eyelet 11 is molded to the flat end of the dilator, thus providing an easier grip by hand or instrument. Also, a plurality of small openings 12 (four being shown) are drilled into the body at its distal end so as to enable the surgeon to suture the mold to the edge of the vaginal vestibule.

For draining purposes, the cylindrical body is provided with a helical groove 12' ending at the distal part of the body. The helical groove may be about ⅓ cm. in width to obtain satisfactory drainage. Pressure on the urethra is obviated by provision of longitudinal groove 13.

A mold or dilator of the above-described nature has the advantage of being easily sterilized like any other surgical instrument, of giving satisfactory service to the patient and of being easily removed.

For post-operative use, the cylindrical body may also be provided with a handle instead of the eyelet 11, thus enabling the woman simply to insert the mold or dilator for short treatments over a period of weeks.

While the invention has been described and illustrated in connection with a preferred embodiment thereof, it should be clearly understood that various changes and modifications may occur to those skilled in the art without departing from the scope of this invention as defined in the appended claims.

What is claimed is:

1. A vaginal mold consisting of a substantially cylindrical body having a dome-shaped end, said body being provided with a helical drainage groove and with a longitudinal groove both extending toward the end of said body opposite said dome-shaped end, said dome-shaped end being shaped to fit a human vagina and joining the cylindrical part of said body without substantial discontinuity.

2. A vaginal mold according to claim 1, wherein the end of said body opposite said dome-shaped end is substantially flat.

3. A vaginal mold according to claim 1, wherein the end of said body opposite said dome-shaped end is provided with an extension facilitating withdrawal of the mold from a vagina.

4. A vaginal mold according to claim 1, wherein the end of said body opposite said dome-shaped end is provided with a plurality of circumferentially arranged openings traversing said body at an inclination to its axis.

5. A vaginal mold according to claim 1, wherein said body consists of synthetic resin.

6. A vaginal mold according to claim 5, wherein said synthetic resin is an acrylic resin.

7. A vaginal mold consisting of a substantially cylindrical body of synthetic resin having a helical drainage groove and a longitudinal groove, both grooves extending to one end of said body, said body being flat at said one end and having a plurality of circumferentially arranged openings at said flat end.

8. A vaginal mold consisting of a substantially cylindrical body of synthetic resin having a helical drainage groove and a longitudinal groove, both grooves extending to one end of said body, said body being flat at said one end and being provided with an eyelet mounted on said flat end.

9. A vaginal mold comprising a substantially cylindrical body, said body being provided with at least one drainage groove extending from one of its ends toward the other, one of said ends being rounded and shaped to fit the human vagina, and means at the end of said body opposite said rounded end for facilitating withdrawal of said body from the vagina.

References Cited in the file of this patent

UNITED STATES PATENTS 1,051,129    Lapham _____ Jan. 21, 1913